Jan. 13, 1948.　　　E. A. WILLIFORD　　　2,434,450
ACCELERATED LIGHT FASTNESS TESTING APPARATUS
Filed Oct. 1, 1941
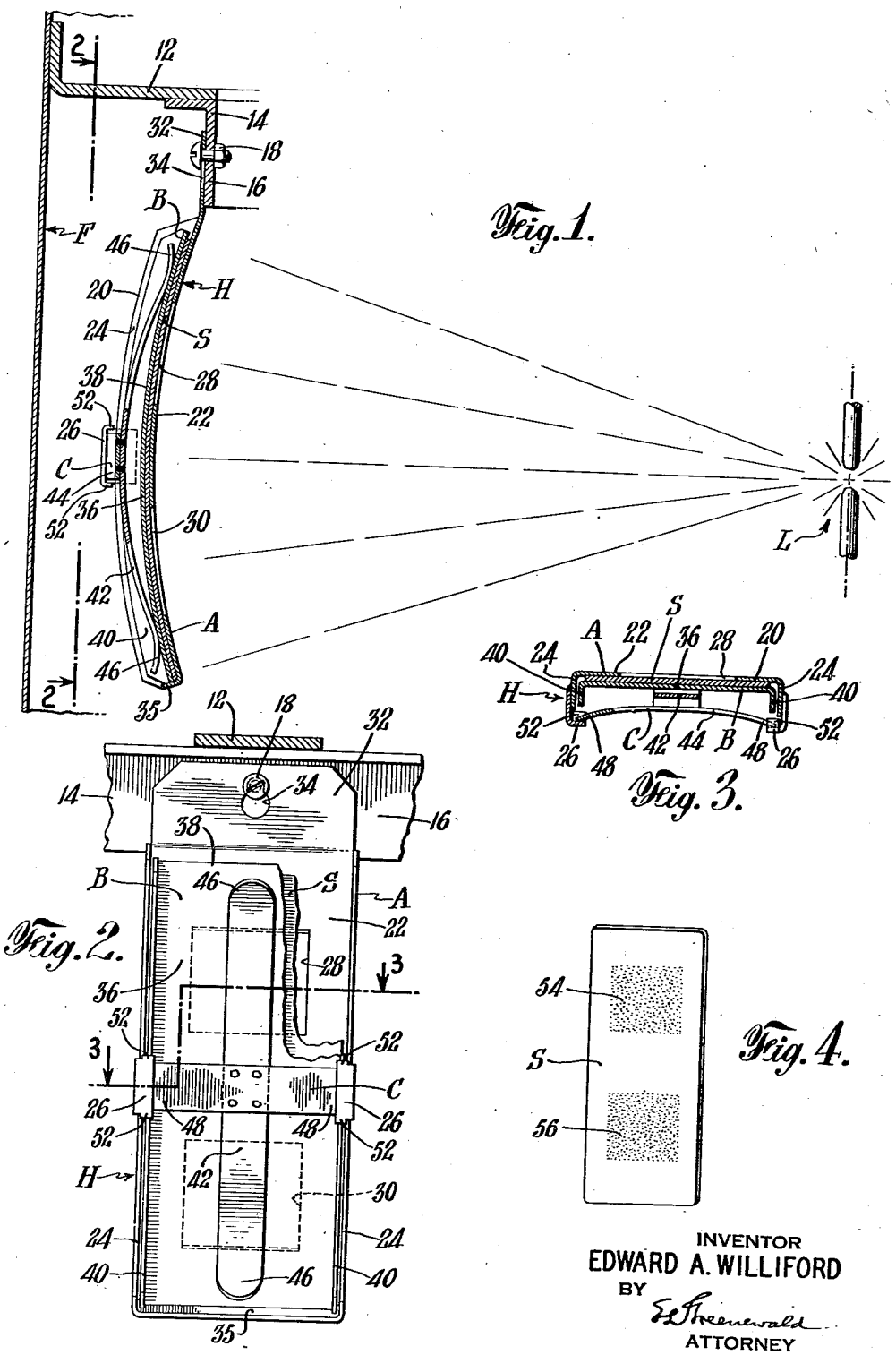
INVENTOR
EDWARD A. WILLIFORD
BY
ATTORNEY Patented Jan. 13, 1948

2,434,450

UNITED STATES PATENT OFFICE 2,434,450

ACCELERATED LIGHT FASTNESS TESTING APPARATUS

Edward A. Williford, White Plains, N. Y., assignor to National Carbon Company, Inc., a corporation of New York Application October 1, 1941, Serial No. 413,125

6 Claims. (Cl. 73—150)

This invention relates to the accelerated testing of the action of light upon materials, and more particularly to apparatus for holding a sample of a material under test in predetermined relation to a source of ultra-violet light.

In determining the life of material such as textile, paper, or other dyed or colored materials, it is customary to expose the same to a concentrated source of artificial light, preferably of a type whose radiation or energy distribution closely duplicates or is similar to that of natural sunlight. Such tests are commonly known as accelerated light fastness tests or accelerated weathering tests, and the testing apparatus is known generally as an accelerated testing unit. By continually exposing a sample of the material to be tested to a high intensity light source for a predetermined period, the approximate life and other qualities of the dye or coloring material, or of the material itself, may be accurately and economically determined within a relatively short time. Generally, means are provided also for artificially subjecting the test sample to other simulated atmospheric conditions, such as rain, by directing jets of water against the material, or humidity, by controlled moisture content in the air surrounding the test specimen.

Apparatus as heretofore constructed for carrying out such tests usually comprises a cylindrical tank within the internal circumference of which a series of samples are supported. Mounted within the tank and about on the axis thereof, is a source of artificial light, preferably a carbon arc lamp. The samples are mounted in such a manner that they may be slowly rotated about the axis of the holder so that each sample will be subjected to a substantially equal amount of radiation from the light source. Means have also been provided for directing water jets against the samples being tested, when required, or where humidity only is desired, means are provided to simulate the effect of atmospheric moisture thereon.

The samples are supported in holders, which commonly are a pair of flat plates, provided with openings to admit light to the samples. Generally, the samples are substantially rectangular. In certain instances, a part of the sample may be treated with a standard paint or dye and another part of the sample may be treated with the paint or dye under test so that comparisons may be made accurately. The flat holders hitherto in use have been open to the objection that all parts of the sample are not disposed at the same distance from the source of light, whereby there is an unequal intensity of light distribution over the sample to be tested.

It is therefore among the objects of this invention to provide an improved sample holder for use in an accelerated light fastness or weathering tester, in which exposed surface portions of the sample receive an equal intensity of radiation from a light source; to provide a sample holder in which a sample may be easily inserted and removed therefrom; to provide a sample holder which is quickly and easily attachable to and detachable from a support; and to provide an accelerated light fastness tester which is simple in construction and efficient in operation.

These and other objects of the invention will in part be obvious and in part become apparent from the following description and the accompanying drawing, in which:

Fig. 1 is a sectional elevation view of a portion of an accelerated testing apparatus showing the improved sample holder of the invention in relation to the source of artificial light;

Fig. 2 is a rear elevation view of the sample holder shown in Fig. 1;

Fig. 3 is a sectional view taken substantially on the line 3—3 of Fig. 2 and looking in the direction of the arrows; and Fig. 4 is a front view of a tested sample.

Generally speaking, the improved sample holder of the invention comprises novel means for supporting a sample continually in vertically curved conformation, the radius of curvature of the sample being substantially equal to the distance of the sample holder from the center of the light source, and the supporting means comprises a plate having openings whereby light may impinge perpendicularly or normally against a surface of such curved sample. More particularly, a curved backing member is provided for holding the sample in engagement with a curved apertured supporting member, and removable resilient means hold the backing member against the sample to be treated and in nesting engagement with the supporting member.

According to the method of the present invention, the vertically curved sample is continually exposed to a high intensity concentrated source of light or other radiant energy while the sample is revolved in a horizontal plane about a vertical axis extending through the source, the radius of revolution of the sample being substantially equal to the distance of the sample from the center of the concentrated source of radiant energy and also substantially equal to the radius of curvature of the sample. The radius of curvature extended of the sample intersects the axis of revolution of the sample at substantially the center of the light or radiant energy source. Thereby, all exposed portions of the vertically curved sample, being at substantially the same distance from the light source, receive substantially the same amount of radiation from the source and the light rays from the concentrated source impinge substantially normally against the exposed surface of the vertically curved sample.

Referring to the drawing, and more particularly to Fig. 1 thereof, the accelerated testing apparatus includes a source L of high intensity light or radiant energy rich in ultra-violet energy of wave lengths shorter than 4000 Angstrom units, and a preferably circular framework F for supporting one or more sample holders H. Desirably, the source L may comprise a single or multiple carbon arc lamp. Preferably, framework F is mounted for rotation about a vertical axis passing through the light source L, whereby a plurality of sample holders H, which are mounted at spaced intervals around the internal periphery of framework F, may be revolved in a closed horizontal path of revolution about such axis and continually exposed uniformly to radiant energy emitted by the light source L.

In accordance with the principles of the invention, each sample holder H may comprise a vertically curved support or supporting member or shade A having a radius of curvature substantially equal to the distance of a sample S from the light or energy source L. A similarly curved backing member or plate B is provided to continually maintain the sample S in curved conforming engagement with support A, and a resilient means C secures the plate B and sample S in assembled engagement with the support A.

Referring more specifically to the drawing, a circular bracket 12 is secured to the circumferential internal periphery of frame F, as by welding, riveting, or other suitable means, and to the radially inner end of the bracket is secured a circular angle member 14 having a downwardly extending flange 16. At spaced intervals, bolts 18 are mounted in the flange 16 to serve as hangers for the sample holders.

The support or shade A may comprise a channel member 20 having a web 22 and flanges 24, curved longitudinally about an axis such that every point along the surface of the web 22 of the support A is at an equal distance from the light source L. Ears 26 are secured to the flanges 24 about midway of their length, and these ears extend inwardly of the flanges and toward each other for a purpose described hereinafter. The support A is provided with apertures 28 and 30, respectively disposed above and below a horizontal plane extending through the light source L. Light from the light source L may be directed through apertures 28 and 30 and normally against two separate surface areas of the sample S which is held against the back surface of the support, and the flanges 24 are cut away at one end to provide a tongue 32 on the support. The tongue 32 is formed with means such as a keyhole slot 34 by which the sample holder H may be mounted on one of the bolts 18, which latter may then be tightened to secure the holder rigidly to the frame F. At its opposite end, support A is formed with a transverse flange 35 acting as a stop for both the sample S and the backing member B.

The backing plate B may comprise a channel member 36, curved longitudinally about the same axis as the channel 20, and formed with a web 38 and flanges 40.

The support A and the backing plate B are held in assembled relation with the sample S by the resilient means C. As shown, this resilient means may comprise a pair of leaf springs 42 and 44 arranged at right angles in the form of a cross and united at their intersection by suitable means, such as welding. The longitudinally extending leaf spring 42 is curved about a center on a radius much shorter than that about which the support A and the backing plate B are curved, and the ends 46 thereof are curved outwardly in order to give an extended bearing surface against the backing plate B. The transversely extending spring 44 is bowed inwardly—that is toward the light source—and the ends of the spring 44 are adapted to engage beneath the ears 26. The ears 26 may be formed with stops 52 which retain the resilient means C in fixed position lengthwise of the backing plate B.

In operation the sample S, which is shown in Fig. 4, is mounted against the rear surface of the support A, the backing plate B is placed against the sample, and the resilient means C is disposed against the backing plate. The ends 48 of the spring 44 are inserted beneath the ears 26 so that the resilient means C maintains the entire arrangement in assembled relation. It will be noted that the resilient means C may be easily and quickly slid into and out of engagement with the ears 26, due to the outwardly bent ends 46 of the spring 42.

Every part of the sample holder H is at a substantially equal distance from the source of light L. Thereby, the areas of the vertically curved sample S exposed to radiation from the source L, as through the apertures 28 and 30, receive substantially equal intensities of radiation from the source L.

The framework F is rotated about a vertical axis passing through the light source L, whereby the vertically curved samples S are revolved about such axis. As the radii of curvature extended of the samples pass through substantially the center of the light source, the radius of curvature extended intersects or crosses the axis of revolution at substantially the center of the light source. After a predetermined period of exposure of the samples to energy emitted by the light source, the samples are removed and inspected to determine the relative light or weather fastness characteristics of the material being tested.

As shown in Fig. 4, only certain areas of the sample S coinciding with the apertures 28 and 30 are exposed to radiation from the light source L, whereby the main portion of the sample S may remain unaffected by the light source and can be used for comparison purposes. The areas affected by the light source are indicated at 54 and 56 in Fig. 4. Alternatively, one of the areas 54 or 56 may be treated with a standard dye or paint (that is, one whose fading or other weathering properties are known), and the other might be treated with a dye or paint the fading or other weathering properties of which are to be determined.

While, as illustrated, the sample holder is curved only in a longitudinal direction, it may also be curved, if desired, in a lateral direction. However, this is not generally necessary as the width of the sample holder with respect to length is very small, and, correspondingly, the widths of the apertures 28 and 30 are small rel tive to their lengths, whereby there is little variation in intensity horizontally or laterally of the exposed surfaces of the sample.

While a specific embodiment of the invention has been described for the purpose of illustrating the principles thereof, it should be understood that the invention may be otherwise embodied and the dimensions and interrelation of parts changed without departing from the principles of the invention.

What is claimed is:

1. A sample holder for use in accelerated testing apparatus including a concentrated substantially point source of light, said sample holder being formed to provide equal intensity of light distribution from said source on all portions of a surface of a sample and comprising, in combination, a curved sample supporting member; a curved sample backing member; and removable means holding said members and a sample to be tested in assembled relation; each of said members comprising a channel member having a web and spaced parallel flanges, said supporting member being formed with an inturned ear on each flange; said backing member having nesting engagement with said supporting member; and said removable means comprising a longitudinally extending member engaging the web of said backing member and a transversely extending member engaging said ears.

2. A sample holder for use in accelerated testing apparatus including a concentrated substantially point source of light, said sample holder being formed to provide equal intensity of light distribution from said source on all portions of a surface of a sample and comprising, in combination, a first longitudinally curved channel member formed with a pair of apertures in its web and with an inwardly extending ear on each flange, said pair of apertures providing means whereby two areas of the sample may be exposed to a concentrated high intensity source of radiant energy for comparison purposes; a second channel member curved longitudinally about an axis substantially the same as the axis of said first channel member, said second channel member being adapted to have nesting engagement with said first channel member; and means removably engaging said ears and said second channel member to hold said channel members in assembled relation.

3. A sample holder as claimed in claim 2, in which said last-named means comprises a pair of perpendicularly related leaf springs secured together substantially at their mid-sections, one of said leaf springs engaging said ears and the other of said leaf springs engaging said second channel member to hold the same in nesting engagement with said first channel member.

4. A sample holder as claimed in claim 2, in which said last-named means comprises a first leaf spring extending longitudinally of said channel members and engaging said second channel member to hold the same in nesting engagement with said first channel member; and a second leaf spring extending transversely of said channel members and secured to said first leaf spring, the ends of said second leaf spring engaging said ears to hold said first leaf spring in engagement with said second channel member.

5. A sample holder as claimed in claim 2, in which said last-named means comprises a first leaf spring extending longitudinally of said channel members and having out-turned ends adapted to engage the web of said second channel member; and a second leaf spring secured to said first leaf spring and extending perpendicularly thereto, said second leaf spring being bowed inwardly toward the web of said second channel member and having end portions engaging said ears.

6. In accelerated testing apparatus including a high intensity source of radiant energy, a circular framework mounted for rotation about an axis passing through such source, and a plurality of sample holders mounted at spaced intervals about the circumference of said framework; a sample holder having a radius of curvature substantially equal to the distance between said sample holder and such axis so that the distribution of energy from said source will be equal in intensity on all portions of a surface of said sample, said sample holder comprising, in combination, a first longitudinally curved channel member formed with a pair of apertures in its web and with an inwardly extending ear on each flange, said pair of apertures providing means whereby two separate samples or two areas of the same sample may be exposed to a concentrated high intensity source of radiant energy for comparison purposes, a second channel member curved longitudinally about an axis substantially the same as the axis of said first channel member, said second channel member being adapted to have nesting engagement with said first channel member, and means removably engaging said ears and said second channel member to hold said channel members in assembled relation.

EDWARD A. WILLIFORD.

REFERENCES CITED

The following references are of record in the file of this patent:

UNITED STATES PATENTS

| Number | Name | Date |
| --- | --- | --- |
| 884,297 | Sabroe | Apr. 7, 1908 |
| 966,016 | Herman | Aug. 2, 1910 |
| 1,458,941 | Jameson | June 19, 1923 |
| 1,558,786 | Buttolph | Oct. 27, 1925 |
| 1,842,313 | Chaney | Jan. 19, 1932 |
| 2,182,325 | Tucker | Dec. 5, 1939 |

FOREIGN PATENTS

| Number | Country | Date |
| --- | --- | --- |
| 204,587 | Great Britain | Oct. 4, 1923 |